Patented Apr. 14, 1953

2,635,115

UNITED STATES PATENT OFFICE 2,635,115

SUBSTITUTED 4-ACETAMIDOBENZALDE-HYDE THIOSEMICARBAZONES

Jack Bernstein, New Brunswick, William A. Lott, Maplewood, and Frederick Y. Wiselogle, Kingston, N. J., assignors to Mathieson Chemical Corporation, New York, N. Y., a corporation of Virginia No Drawing. Application April 19, 1950, Serial No. 156,944

1 Claim. (Cl. 260—552)

This invention relates to: (I) the compound 4-acetamidobenzaldehyde 4-isobutyl-thiosemicarbazone, i. e.,

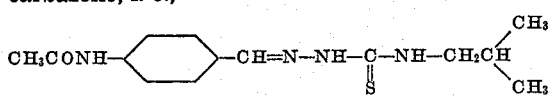

(II) its pharmaceutical forms; and (III) a method of preparing it.

Prior to this invention, a number of substituted 4-acetamidobenzaldehyde thiosemicarbazones had been prepared and screened for antituberculous activity; but the various types of substitution attempted all appeared to lessen activity and/or increase toxicity (i. e., none was superior to the prototype, 4-acetamidobenzaldehyde thiosemicarbazone), contraindicating further investigation in that direction.

It is the object of this invention to provide a novel substituted 4-acetamidobenzaldehyde thiosemicarbazone which is superior to the prototype, and hence promises to be a utilizable and valuable chemotherapeutic, especially antituberculous, agent. Thus, in oral tests in mice for antituberculous activity, the compound of this invention is both less toxic and more effective than the prototype.

The compound of this invention is characterized by an isobutyl substituent in the terminal thiosemicarbazone-nitrogen, as shown in the formula given hereinbefore. It may be obtained, for example, by interacting p-acetamino-benzaldehyde with 4-isobutyl-thiosemicarbazide in an aqueous-alcoholic medium, and recovering the precipitate.

The following example is illustrative of the invention:

(a) A solution of 34.5 g. isobutyl-isothiocyanate in 45 ml. absolute alcohol is added dropwise to a cold solution of 18 g. hydrazine hydrate in 45 ml. absolute alcohol, while stirring vigorously and maintaining the temperature at 10–15° C. The reaction mixture is then stirred for an additional hour; and 75 ml. hexane is added dropwise. The crystalline solid which separates (4-isobutyl-thiosemicarbazide) is filtered off and washed with hexane (yield about 33 g.; melting point about 77–8° C.). The product need not be recrystallized for use in production of 4-acetamidobenzaldehyde 4-isobutyl-thiosemicarbazone as described in the following section.

(b) 16.3 g. p-acetamino-benzaldehyde is dissolved in a hot mixture of 150 ml. water and 25 ml. ethanol; and this solution is added to a solution of 14.7 g. 4-isobutyl-thiosemicarbazide, i. e.,

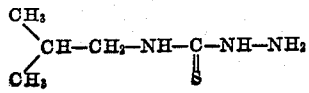

in 100 ml. hot water (to which sufficient ethanol has been added to complete solution of the 4-isobutyl-thiosemicarbazide). The reaction is spontaneous, precipitating the product (4-acetamidobenzaldehyde 4-isobutyl-thiosemicarbazone) in substantially quantitative yield. On recrystallization from 95% ethanol, the product melts at about 151–2° C. (overall yield, about 75%). Analysis reveals it to be the hemihydrate (the non-hydrate being obtainable therefrom by maintaining it at 130° C. under high vacuum).

The product is substantially insoluble in water and in ethanol. Like the prototype compound, the product is active perorally, and may be administered in the same pharmaceutical forms, i. e., dispersed or solubilized in an aqueous medium, or (preferably) in orally-administrable dosage-unit carriers (e. g., tablets or capsules). Thus, it may be incorporated in gelatin capsules each containing 25–200 mg. of the product. Alternatively, tablets containing 25–200 mg. of the product may be formed by preparing a granulation of the compound with such binders as acacia, lactose or starch [i. e., moistening, adding one or more of these binders, drying, screening, and adding a lubricant, such as stearic acid powder], and compressing the granulation into tablets each containing the selected dosage.

The invention may be variously otherwise embodied—as by combining other therapeutic agents with the product—within the scope of the appended claim.

We claim:

4-acetamidobenzaldehyde 4-isobutyl-thiosemicarbazone.

JACK BERNSTEIN.
WILLIAM A. LOTT.
FREDERICK Y. WISELOGLE.

References Cited in the file of this patent

Bernstein et al.: "J. Am. Chem. Soc.," vol. 73, Mar. 1951, p. 909.

Donovick et al.: "J. Bacteriology," vol. 59 (1950), p. 669.

Hoggarth et al.: "Brit. J. Pharmacol.," vol. 4, Sept. 1949, pp. 250 to 253.

Moncorps et al.: "Medizinische Klinik," vol. 42, Nov. 15, 1947, p. 812.

Domagk: "Naturwissenschaften," vol. 33, Nov. 30, 1946, p. 315.

Domagk: "Zentralblatt fur Gynakologie," vol. 69 (1947), p. 837.

Sacks et al.: "Ber. deut. chem.," vol. 39 (1906), p. 2167.